Nov. 13, 1956            F. RINGS            2,770,132
WATER METER WITH CONCENTRICALLY
ARRANGED CONNECTION CHANNELS
Filed Dec. 29, 1954
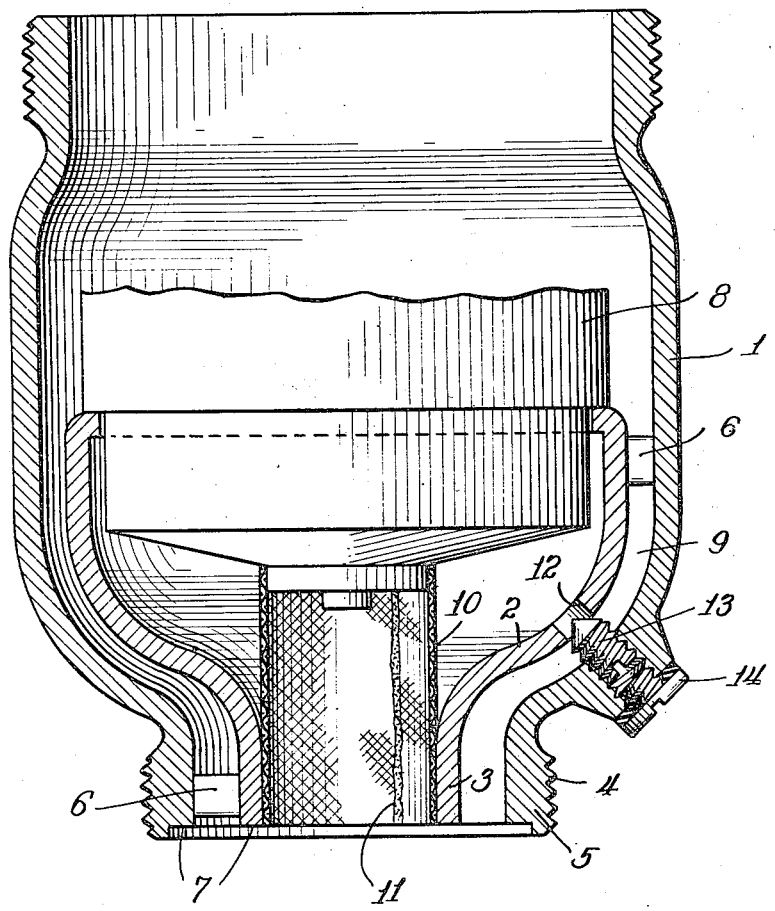
INVENTOR.
Franz Rings
BY
Jones, Tesch & Darbo Att'ys.

United States Patent Office 2,770,132
Patented Nov. 13, 1956

2,770,132

WATER METER WITH CONCENTRICALLY ARRANGED CONNECTION CHANNELS

Franz Rings, Nahne, near Osnabruck, Germany, assignor to G. Kromschröder Aktiengesellschaft, Osnabruck, Germany Application December 29, 1954, Serial No. 478,316

2 Claims. (Cl. 73—273)

This invention relates to an improvement and modification of my invention described and claimed in the specification of my co-pending application "Through-Flow Device, Particularly Annular Piston Water Meter With Pipe Line Connector Piece," Ser. No. 446,207 of July 28, 1954.

In the specification of said co-pending application, a water meter has been described having a housing in which the inlet and the outlet channels are concentric with respect to each other. Such a design of the water meter housing provides for a connection to a corresponding pipe adapter piece provided with corresponding concentric channels, strain exerted on the water meter being eliminated thereby.

Up to now the water filter in common manner arranged in front of the water meter could only be so installed that the whole measuring mechanism must be removed and the meter had to be disassembled to a large extent in order to remove the filter.

It is the object of the invention to provide in contrast to the above described disadvantageous design a water meter with concentrically arranged connection channels in which a cylindrical filter body is inserted in the inlet channel forming the inner of the two concentrically arranged channels so as to be located between the connecting sealing face and the measuring mechanism. With such a design it is only necessary to release the screw joint between the water meter and the pipe union. The water filter can then conveniently be inserted or removed from the water meter without the necessity to disassemble the meter. In spite of the easy interchangeability of the filter, the latter has a relative large surface. Such a design and arrangement of the water filter can be used with impeller wheel meters and also with cylindrical piston water meters. The concentrical arrangement of the connection channels or snouts is further advantageous in respect to the design of the regulating mechanism for impeller wheel meters. For, further according to the invention, the throttle opening in known manner regulated by means of an adjusting screw can be arranged in the inner housing forming the partition wall separating the concentric channels, and the adjusting screw can be screwed into the outer wall of the housing.

A great simplification of the construction and a cheaper manufacture result from this novel design and arrangement according to the invention.

An embodiment of the invention shown in cross-section, is illustrated in the drawing and more fully described in the detailed description hereinbelow.

A bell shaped open-ended inner housing 2 is arranged in the water meter outer housing 1. The inner housing has a connection snout 3 which extends concentrically into outer housing connection snout 5 which may be externally threaded as at 4. The inner housing 2 is connected with the housing 1 by means of bridges 6. The snouts 3 and 5 end in a joint connection sealing surface 7. The measuring mechanism 8 is inserted into the inner housing 2 from above and protrudes into the bell shaped interior space of the latter.

The water flows thus through the snout 3 into the interior space of the inner housing 2, enters then the lower part of the measuring mechanism 8, leaves the upper part of the measuring mechanism 8 and leaves the meter through the annular channel 9 which is formed between the outer housing 1 and the inner housing 2, the annular channel 9 enclosing concentrically the inlet snout 3.

A cylindrical filter body 10 is inserted into the inlet snout 3, the interior space of the filter body being closed at its upper end by the bottom of the measuring mechanism 8. The water must therefore penetrate the filter body 10 before reaching the measuring mechanism 8. The filter body 10 is formed of an originally plane sieve which has been given a cylindrical shape and which is soldered along a longitudinal seam 11. The filter body 10, nested within snout 3, can be pulled out downwards in convenient manner without the necessity of removing the measuring mechanism 8. A filter body which is closed at its upper end by means of a sieve disk can of course also be inserted into the socket 3 in corresponding manner. Thus, it is not absolutely required to use the bottom of the measuring mechanism to provide a closing face for the filter. The measuring mechanism 8 may be designed as an impeller wheel system or as a cylindrical piston system. In case, the measuring mechanism 8 is designed as an impeller wheel system, a throttle opening 12, which can be adjusted by means of the regulating screw 13, is provided in the carrying appliance 2. The regulating screw 13 penetrates the annular channel 9 and is screwed into the wall of the housing 1. The threaded hole of the regulating screw 13 is outwardly closed by means of a screw plug 14. Owing to the concentrical arrangement of channels, the regulator device which is necessary for impeller wheel water meters can be designed in especially simple manner and can be mounted easily and without considerable expense.

I claim:

1. In a water meter including a generally cylindrical outer housing having an outlet connection snout at one end thereof and a metering mechanism arranged within said housing, an open-ended inner housing mounted within said outer housing coaxially therewith and having an inlet connection snout extending concentrically into said connection snout of said outer housing, said inner housing being spaced from said outer housing to form an annular outlet passageway therebetween, said meter mechanism being mounted in and closing the inner end of said inner housing leaving a space within said inner housing, and a cylindrical filter body nested within and engaging the inner surface of said connecting snout of said inner housing and extending into the space within said inner housing and being so constructed and arranged that all water passing through said connecting snout of said inner housing passes also through said filter body before passing into said metering mechanism.

2. Water meter structure in accordance with claim 1 wherein the filter body is open-ended and extends to, and its inner end is closed by, the metering mechanism.

References Cited in the file of this patent

UNITED STATES PATENTS 1,697,840    Hayes et al. _____ Jan. 1, 1929

FOREIGN PATENTS 55,075    France _____ Dec. 20, 1950